Jan. 8, 1963 J. B. WALLACE 3,072,736
ELECTRICAL POWER DISTRIBUTION BUS DUCT SYSTEM
Filed July 1, 1959 4 Sheets-Sheet 1

Jan. 8, 1963  J. B. WALLACE  3,072,736
ELECTRICAL POWER DISTRIBUTION BUS DUCT SYSTEM
Filed July 1, 1959  4 Sheets-Sheet 4

United States Patent Office 3,072,736
Patented Jan. 8, 1963

3,072,736
ELECTRICAL POWER DISTRIBUTION BUS
DUCT SYSTEM
James B. Wallace, Beaver, Pa., assignor to Westinghouse
Electric Corporation, East Pittsburgh, Pa., a corporation
of Pennsylvania
Filed July 1, 1959, Ser. No. 824,287
6 Claims. (Cl. 174—99)

This invention relates to bus duct systems of electrical power distribution, and more particularly to means for supporting a number of bus bars in the duct.

In a bus duct system of electrical power distribution, the bus bar supports are subjected to considerable striking forces from the bus bars when a short circuit occurs. These supports have ordinarily been made of wood, ceramic material, or a relatively weak cold molded material, and they have often broken under short circuit conditions.

It has been found that bus bar supports hot molded from a glass filled resinous composition can be used dependably under all conditions because of the high impact and flexural strength of the material. The material also has high dielectric and non-tracking properties which make it ideal for this application. The use of this high strength material has also permitted various new changes in the structure of bus bar supports.

Accordingly, it is an object of this invention to provide a bus bar support made from a hot molded glass filled resinous composition.

A further object is to provide a lightweight channeled bus bar support for low impedance bus duct.

Another object is to provide a bus bar support with a number of transverse grooves having curved surfaces for receiving the bus bars.

Another object is to provide a pair of bus bar supporting members which are fastened with a key member.

Another object is to provide a plug-in bus bar support which can be used with either a three wire system, a four wire full neutral system, or a four wire half neutral system.

Another object is to provide a substantially hollow lightweight support for a plurality of bus bars.

In accordance with one embodiment of the invention, a pair of oppositely disposed bus bar supports are drawn towards each other firmly gripping the bus bars. The fastening member for these supports has a key portion which mates with a key surface in one of the supports whereby rotational movement of the fastening member is prevented so that the bus duct can be assembled from only one accessible side. The bus bar receiving grooves of these supports have curved surfaces that permit bowing of the bus bars under short circuit conditions without any unnecessary stress on any part of the grooved area. In addition, an open channel through the length of each support provides a light-weight strong section made from a minimum amount of material.

In accordance with another embodiment of the invention, insulating plug-in bus bar supports are spaced equally on alternate sides of the duct. These substantially hollow supports are of the type through which it is possible to insert the contact elements of a plug-in device. These support members have grooves for receiving three phase conducting bus bars and additional grooves for receiving either a full size neutral or a half size neutral bus bar.

For a better understanding of the nature and objects of the invention, reference may be had to the following detailed description, taken in conjunction with the accompanying drawings, in which.

Figure 7:
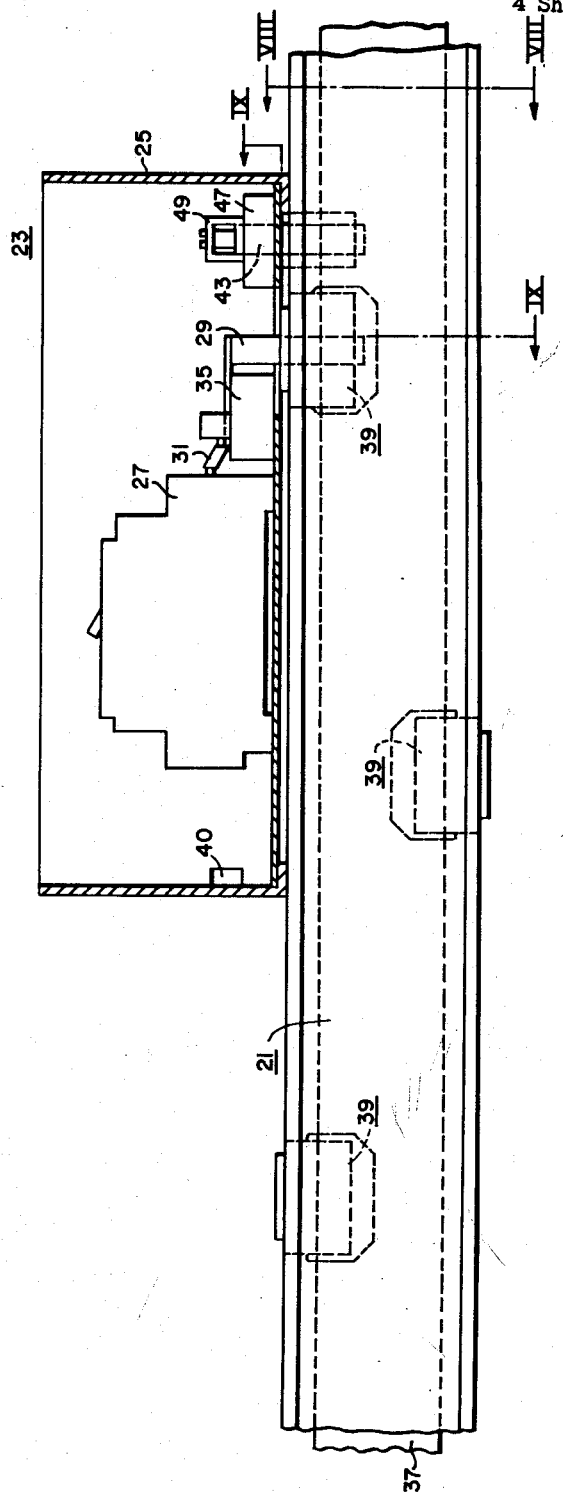
FIG. 7 is a view, partly in side elevation and partly in section, of a portion of a three phase, four wire, full neutral plug-in bus duct with a plug-in unit attached for power takeoff.
Figure 9:
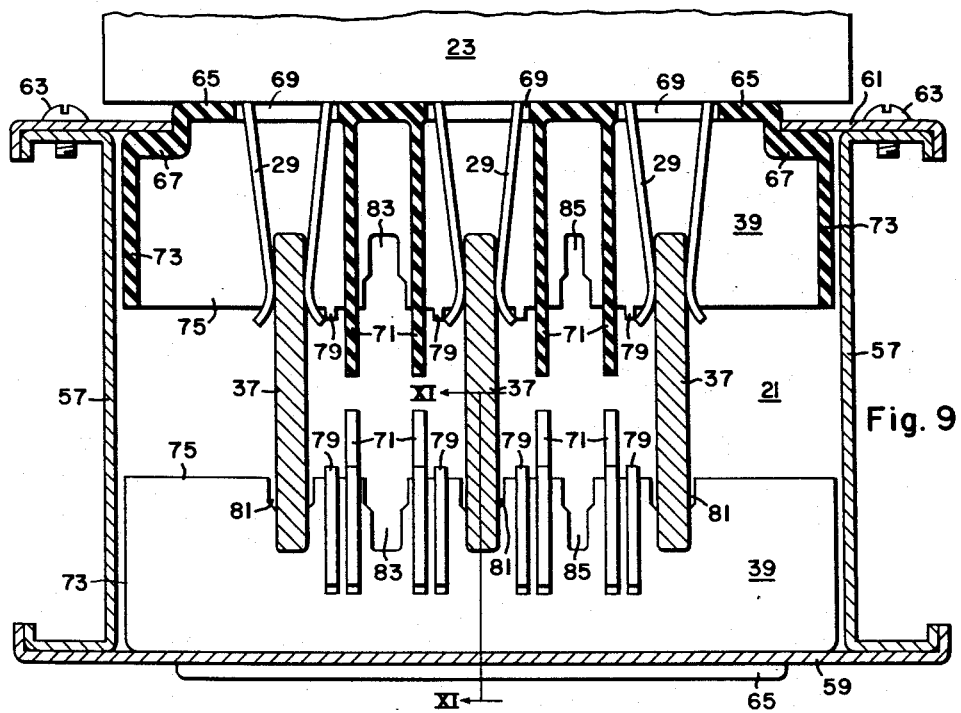
FIG. 9 is a sectional view taken along line IX—IX of a figure similar to FIG. 7 without a neutral bus bar and without a neutral plug-in element.
Figure 10:
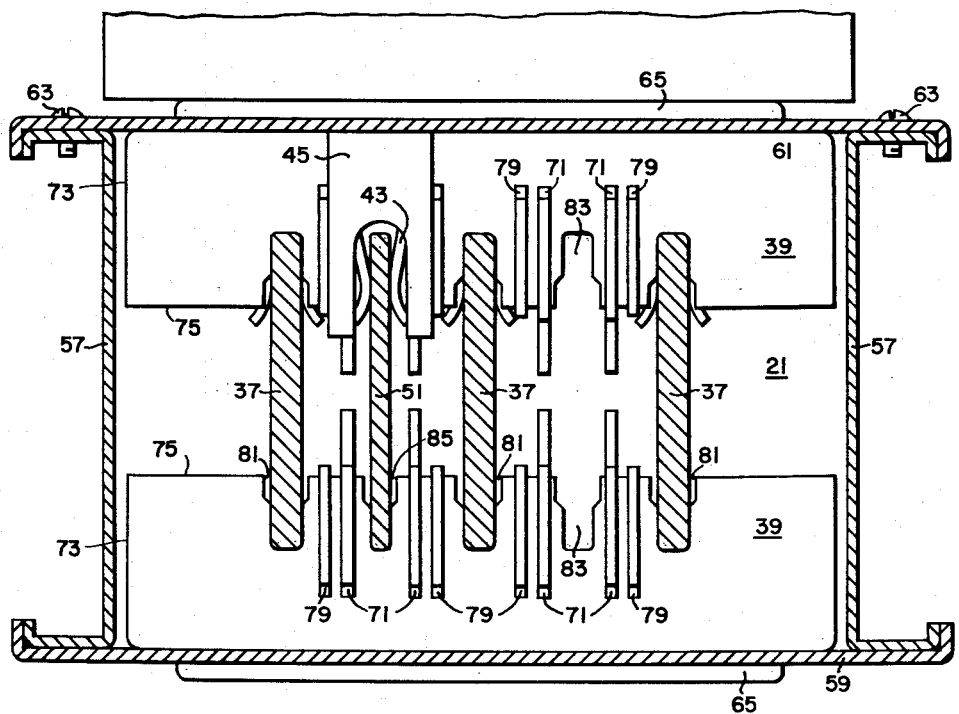
Figure 11:
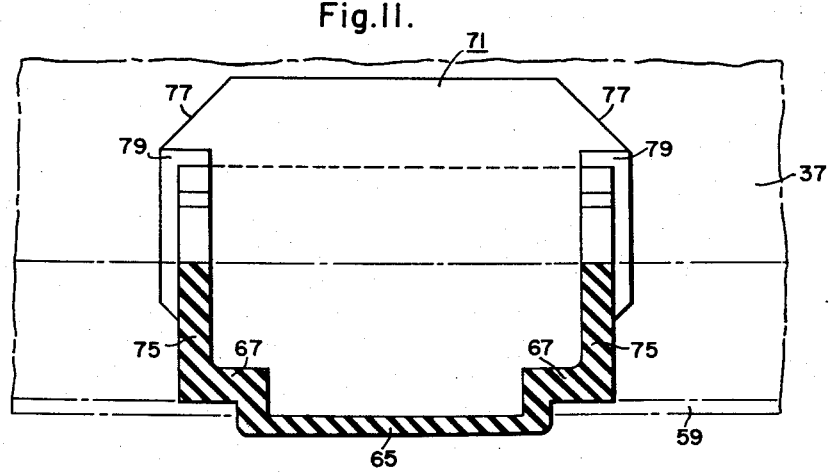

FIG. 10 is a sectional view, taken along line VIII—VIII of a figure similar to FIG. 7 with a half neutral bus bar instead of a full neutral bus bar, and a plug-in element adapted to make contact with the half neutral bus bar. The bus bar supports are turned around endwise in this figure to interchange the position of the neutral groove for receiving the half neutral bus bar; and FIG. 11 is an enlarged sectional view taken along line XI—XI of FIG. 9, the bus bar being shown by a dash-dot line.

Figure 1:
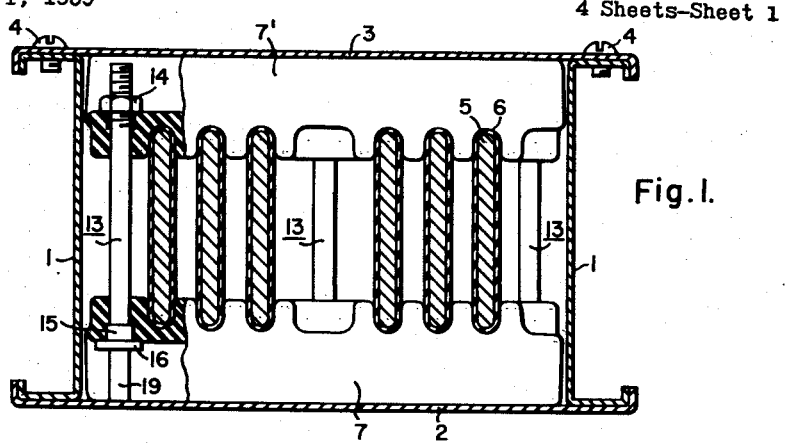
FIGURE 1 is a cross sectional view of a low impedance bus duct with portions of the supporting members being shown in section.

Referring to the drawings, and particularly to FIG. 1, the bus duct housing is of the four-channel interlocking type of construction. Two generally channel-shaped parallel members 1 are welded at their lower flanges to a side member 2 and are removably fastened at their upper flanges to another side member 3 by screws 4.

The bus bar conductors 5 which are supported within the housing are of the low impedance type being fully insulated at 6 except for a short space where the sections are electrically connected. The bus bars, as shown, form two three phase sets of conductors. The conductors within each set are closely spaced in actual size on ¾ inch centers.

Figure 2:
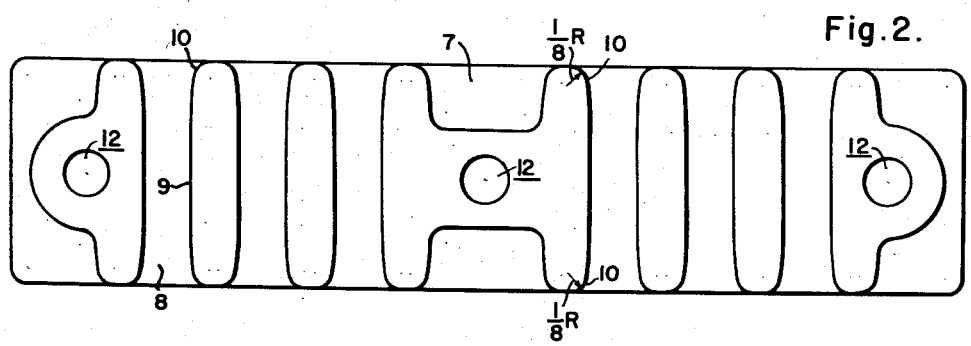
FIG. 2 is an enlarged top plan view of the bottom supporting member of FIG. 1.

The bus bars 5 are supported within the housing between a bottom support member 7 and a top support member 7' of identical construction. Each of the support members has internal transverse grooves 8 formed therein for receiving the edges of the bus bars. As is best shown in FIG. 2, the corner portions 10, of the side walls 9, are transversely curved in actual size on approximately a one-eighth inch radius. The advantage of having transversely curved sidewalls for the bus bar receiving grooves is that the bus bars may bow sidewise between supports under short circuit conditions without putting unnecessary forces against any corners of the sidewall grooves. This renders the supports more dependable under short circuit conditions.

Figure 4:
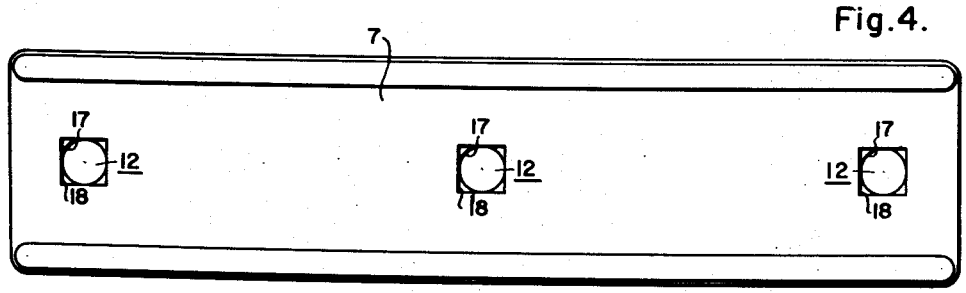
FIG. 4 is an enlarged bottom plan view of the supporting member shown in FIG. 2.
Figure 5:
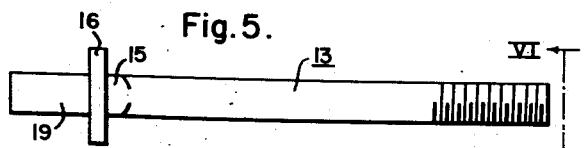
FIG. 5 is an enlarged side elevational view of one of the fastening members shown in FIG. 1.
Figure 6:
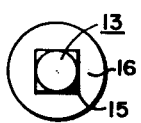
FIG. 6 is an end view of the fastening member looking in the direction of the arrows shown in FIG. 5.
Figure 3:
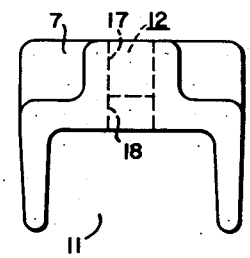
FIG. 3 is an end view of the supporting member shown in FIG. 2.

As shown in FIGS. 3 and 4, each of the support members 7 and 7' has a longitudinal generally U-shaped channel 11 formed at its external side. Each of the support members has three openings, indicated generally at 12, therein, each of which is adapted to receive a fastening member 13. The fastening member 13 is threaded at one end to receive a fastening nut 14 (FIG. 1). The fastening member 13 (FIG. 5) has a circular cross section except for a key portion 15 formed integral therewith which has a square-shaped cross section. A disc-shaped flange 16 is also formed integral with the fastening member 13. Each of the openings 12 of the supporting members 7 and 7' has a cylindrical internal surface at 17 for receiving the main portion of the fastening member 13, and a rectangular-shaped internal key receiving surface 18 for receiving and mating with the key portion 15 of the fastening member. One end 19 of the fastening member 13 extends out a short distance from the flange 16.

The shape of the fastening member 13 and of the openings 12 of the support members 7 and 7' permit a quick convenient assembly of the bus duct from only one accessible side. The housing side member 2 and parallel members 1 which are welded together are first placed in position. Three fastening members 13 are then placed in the openings 12 of the bottom support member 7. Because the support members 7 and 7' are of identical construction, they are identified as bottom and top support members only by a random selection. The bottom support member with the three fastening members is then placed in position within the housing.

As best seen in FIG. 1, the ends 19 and flanges 16 of the fastening members 13 position these members so that the key portions 15 fit within and mate with the key receiving surfaces of the openings 12 in the bottom support member 7.

After the bottom support member 7 and fastening members 13 are in place, the bus bars 5 are placed in position within the grooves 8 of the bottom support member. The top support member 7' is then placed in position and the nuts 14 are threaded onto the fastening members 13. These nuts can be tightened from one side since rotational movement of the fastening members 13 is prevented because the key portions 15 are mated in the internal key receiving surfaces 18 of the bottom support member openings 12. The last step in the bus duct assembly is to place the housing side member 3 in position and fasten it to the housing parallel members 1 with the screws 4.

The support members 7 and 7' are light-weight and made from a minimum amount of material because of the longitudinal external channels 11 which makes them of a substantially hollow construction. This structure is possible because of the high strength of the material. The support members are made up from a hot molded glass filled resinous composition which has a very high impact and flexural strength and which also has high dielectric and non-tracking properties, thereby making it ideal for this application.

Particularly satisfactory results have been obtained using glass filled polyester resins. All or a portion of the glass fiber filaments may be replaced with one or more of the following fillers: mica, asbestos, silica or alumina ($Al_2O_3 \cdot 3H_2O$), to impart arc and track resistance. If desired, when formulating the polyester, polymerization inhibitors may be incorporated therein in amounts up to about 5% by weight. Pigments such as zinc oxide, iron oxide and the like may also be employed. In general, peroxides are preferred catalysts to use in effecting polymerization of these resins.

A modification of the invention is shown in FIGS. 7 through 11. The structure shown in FIGS. 7 and 8 comprises a portion of plug-in bus duct 21 having a plug-in unit 23 installed thereon. The plug-in unit 23 includes a metal housing 25 having a removable or openable cover (not shown). A circuit interrupting device 27, which may be an automatic circuit breaker, is mounted inside the housing 25 and has its line terminals electrically connected to three contact elements 29 by three flexible conducting connections 31 (FIG. 7). The contact elements 29 are supported by an insulating member 35 which is mounted on the base of the housing 25. The three contact elements 29, which are commonly called stab connectors, engage three phase conducting bus bars 37 (FIG. 8) that are supported within the housing by plug-in insulating support members 39. In this manner, the circuit breaker 27 is electrically connected to the bus bars 37 when the plug-in unit 23 is in the operating position on the bus duct.

It will be understood that load terminal connectors (not shown) are provided in the circuit breaker 27 and are connected by suitable conductors to power consuming machines or other electrical apparatus. These connections may be made through wires in conduits entering the housing 25 through knock-outs 40.

Figure 8:
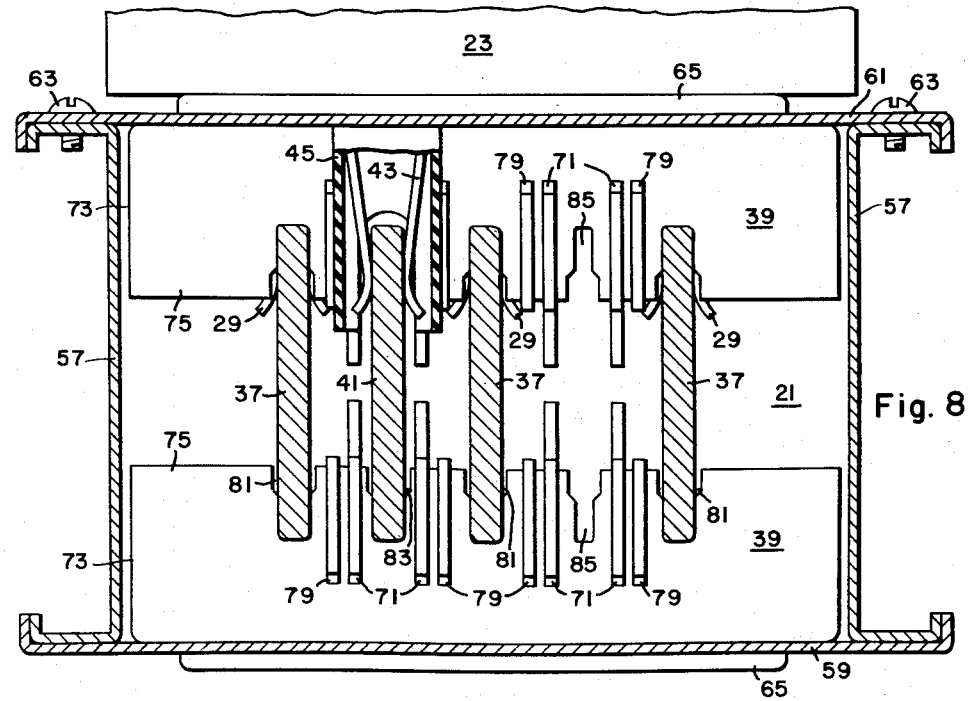
FIG. 8 is an enlarged sectional view taken along line VIII—VIII of FIG. 7, the insulating shield for the neutral contact element being shown partly in cross section.

As shown clearly in FIG. 8, a full size neutral or grounded bus bar 41 is also supported within the bus duct housing by the plug-in support members 39. A contact element or stab connector 43 is provided for making electrical contact with the neutral bus bar 41, and is surrounded by an insulating shield 45. The neutral contact element 43 is mounted on an insulating support 47 (FIG. 7) attached to the base of the plug-in unit housing 25. A terminal connector 49 (FIG. 7) is provided for making an electrical connection to the neutral contact element 43.

FIG. 8 is a sectional view taken along line VIII—VIII of FIG. 7, the insulating shield 45 being shown partly in cross section. For the purposes of clarity, FIG. 9 illustrates a sectional view taken along line IX—IX of a figure similar to FIG. 7 without a neutral bus bar 41. FIG. 10 is a sectional view taken along line VIII—VIII of a figure similar to FIG. 7 except that there is a half neutral bus bar 51 instead of the full neutral bus bar 41. The bus bar supports 39 are turned around endwise in FIG. 10 to position the neutral slots 85 for receiving the half neutral bus bar 51. The FIGURES 9 and 10 are provided to more clearly illustrate the structure and utility of the plug-in support members 39.

Referring to FIGS. 8, 9 and 10, the bus duct housing is of the four-channel interlocking type of construction. Two generally channel-shaped parallel members 57 are welded at their lower flanges to a side member 59, and are removably fastened at their upper flanges to another side member 61 by screws 63.

The plug-in type bus duct of this embodiment of the invention is not of the low impedance type. The uninsulated phase conducting bus bars 37 are spaced in actual size on two inch centerlines, and the uninsulated neutral bus bars 41 (FIG. 8) and 51 (FIG. 10) are spaced on one inch centerlines from their neighboring phase conducting bus bars.

The side members 59 and 61 of the bus duct housing are provided with longitudinally spaced plug-in openings staggered lengthwise on opposite sides of the bus duct as indicated in FIG. 7. A plug-in support member 39 is provided at each of the openings in the side members 59 and 61. When a neutral bus bar is used in the duct, an additional opening is provided at each of the plug-in openings to receive a neutral contact element and insulating shield.

A feature of this invention is the construction of the insulating plug-in support members 39, which support the bus bars in proper relation in the duct and also receive the contact members which are inserted through the plug-in openings in the housing side members 59 and 61. As shown more clearly in FIG. 9, each of the support members 39 is molded in one piece, and is provided with an outer surface having a raised portion 65 and a shoulder portion 67. The raised portion 65 of the support member 39 fits through a companion opening in one of the side members 59 or 61 with slight clearance, and the shoulder portion 67 prevents further outward movement of the support member. There are three opening 69 in the raised portion 65 of each support member 39 for allowing passage of the contact elements 29 which make electrical contact with the phase conducting bus bars 37. As illustrated in FIGS. 7, 8 and 10, the neutral contact element 43, when used, does not pass through the support members 39.

As shown in FIG. 9, each of the support members 39 is hollow except for four insulating shields 71 which are molded integral with the unit. The substantially hollow support member 39 is defined by the outer surface 65, 67, and by two parallel end walls 73 and two parallel side walls 75. There is no surface closing the inner side of the support member 39. The insulating shields 71 extend a short distance beyond the inner end of this member to provide over-the-surface clearance between the electrical contact elements 29. As shown in FIG. 11, the corners of the insulating shields 71 are cut off at 77 to give added strength to the shields. Because of these cut corners 77, insulating shields 79 are positioned at the inner ends of the side walls 75, near each insulating shield 71, in order to provide additional over-the-surface clearance between the bus bars 37.

A feature of this invention is that the same support members 39 can be used with either a three-wire system, a four-wire ½ neutral system or a four-wire full neutral system of power transmission. It will be noted, for example in FIG. 9, that there are three grooves 81 of identical size in each of the support member sidewalls 75 for receiving the three phase conducting bus bars 37. There is a fourth groove 83 of the same size as the grooves 81 in each sidewall 75 for receiving the full size neutral bus bar 41 (FIG. 8). A fifth groove 85 of a smaller size is provided in each of the support member sidewalls 75 for receiving the half size neutral bus bar 51 (FIG. 10). Referring to FIGS. 8, 9 and 10, it will be seen that the same support members 39 are used with three different power transmission systems, i. e., a three-wire system in FIG. 9, a four-wire full neutral system in FIG. 8, and a four-wire half neutral system in FIG. 10. It will be noted that in use, there are always unfilled grooves in the support members 39. This structure is possible because the support members 39 are made up from the same high strength hot molded glass filled resinous composition that was previously discussed in connection with the preferred embodiment of this invention. The unfilled grooves, for example 83 and 85 in FIG. 9, create weak spots which would crack or break under short circuit stresses if the previously used materials, such as wood, ceramics or some of the comparatively weak cold molded materials were used in this structure.

It should be again noted that the support member 39 is hollow except for the insulating shields 71. This lessens the expense of manufacturing the support members and provides for considerably lighter weight bus duct units. This hollow design is also made possible by the high strength of the hot molded glass filled resinous composition previously described.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A bus duct system including, in combination, a housing, a plurality of substantially flat bus bars arranged in a parallel spaced mutually flatwise relation within said housing, bus bar supporting means comprising a pair of support members, each of said support members having a plurality of internal grooves for receiving said bus bars, a first of said support members having external laterally spaced confronting walls defining an open channel, fastening means including a fastening member having a key portion near one end, said first support member having an opening therein receiving and mating with said key portion to prevent rotational movement of said fastening member, said one end of said fastening member extending outward from said key portion a distance such that when said first support member and said fastening member are positioned within said housing with said one end disposed within said channel said one end engages said housing to position said key portion within said opening, the second of said support members having an opening therein receiving the other end of said fastening member, and said fastening means holding said support members toward each other thereby supporting said bus bars within said housing.

2. A bus duct system comprising, in combination, a housing, a plurality of substantially flat bus bars arranged in a parallel spaced mutually flatwise relation within said housing, bus bar supporting means comprising a pair of support members, each of said support members having a plurality of internal grooves for receiving said bus bars, a first of said support members having a recess therein and an opening therethrough adjacent said recess, fastening means including a fastening member having a key portion near one end, said opening receiving said fastening member and being shaped to mate with said key portion to prevent rotational movement of said fastening member, said one end of said fastening member extending from said key portion a distance such that when said first support member and said fastening member are positioned within said housing with said one end disposed within said recess said one end engages said housing to position said key portion within said opening, the second of said support members having an opening therein receiving said fastening member, and said fastening means holding said support members toward each other thereby supporting said bus bars within said housing.

3. A bus duct system including, in combination, a housing, a plurality of substantially flat bus bars arranged in a parallel spaced mutually flatwise relation within said housing, bus bar supporting means comprising a pair of support members, each of said support members having a plurality of internal grooves for receiving said bus bars, a first of said support members having external laterally spaced confronting walls defining an open channel, fastening means including a fastening member having a key portion near one end, said first support member having an opening therein receiving said fastening member and being shaped to mate with said key portion to prevent rotational movement of said fastening member, said one end of said fastening member extending outward from said key portion a distance such that when said first support member and said fastening member are positioned within said housing with said one end disposed within said channel said one end engages said housing to position said key portion within said opening, the second of said support members having an opening therein receiving said fastennig member, and means cooperating with the other end of said fastening member to draw said support members toward each other to thereby effect support of said bus bars within said housing.

4. A bus bar support member comprising an outer surface, a first set and a second set of two substantially parallel sidewalls, a plurality of insulating barriers extending from one to the other of said first set of substantially parallel sidewalls, said first set of substantially parallel sidewalls having five transverse grooves therein for receiving a plurality of bus bars, four of said five grooves being of substantially the same size, the fifth of said five grooves being smaller than said four grooves, said support member being usable with a three-wire bus duct system in which case only three of said four grooves receive bus bars, said support member being usable with a four-wire full neutral bus duct system in which case only said four grooves receive bus bars, said support member being usable with a four-wire half neutral bus duct system in which case only three of said four grooves and said fifth groove receive bus bars, and said support member comprising a molded glass filled resinous composition.

5. A bus duct system comprising, in combination, a housing, a plurality of substantially flat bus bars arranged in a parallel spaced mutually flatwise relation within said housing, bus bar supporting means comprising a pair of support members, each of said support members having a plurality of internal grooves for receiving said bus bars, a first of said support members having external laterally spaced confronting walls defining an open channel, fastening means comprising a fastening member having a key portion near one end and being threaded at the other end, said first support member having an opening therein receiving said fastening member and being shaped to mate with said key portion to prevent rotational movement of said fastening member, said one end of said fastening member extending outward from said key portion a distance such that when said first support member and said fastening member are positioned within said housing with said one end disposed within said channel said one end engages said housing to position said key portion within said opening, the second of said support members having an opening therein receiving said fastening member, and means threadedly engaging said other end of said fastening member to draw said support members toward each other to thereby effect support of said bus bars within said housing.

6. A bus bar support member comprising an outer surface, a first set and a second set of two substantially parallel sidewalls, a plurality of insulating barriers extending from one to the other of said first set of substantially parallel sidewalls, said first set of substantially parallel sidewalls having five transverse grooves therein for receiving a plurality of bus bars, four of said five grooves being of substantially the same size, the fifth of said five grooves being smaller than said four grooves, said support member being usable with a three-wire bus duct system in which case only three of said four grooves receive bus bars, said support member being usable with a four-wire full neutral bus duct system in which case only said four grooves receive bus bars, and said support member being usable with a four-wire half neutral bus duct system in which case only three of said four grooves and said fifth groove receive bus bars.

References Cited in the file of this patent

UNITED STATES PATENTS

| | | |
|---|---|---|
| 1,932,456 | Gaston | Oct. 31, 1933 |
| 2,306,353 | Cole et al. | Dec. 22, 1942 |
| 2,310,919 | Adam | Feb. 16, 1943 |
| 2,341,841 | Carlson | Feb. 15, 1944 |
| 2,733,289 | Warren et al. | Jan. 31, 1956 |
| 2,960,674 | Harton | Nov. 15, 1960 |
| 2,992,401 | Lewis | July 11, 1961 |

FOREIGN PATENTS

| | | |
|---|---|---|
| 493,087 | Great Britain | Oct. 3, 1938 |
| 462,906 | Canada | Jan. 31, 1950 |
| 155,770 | Australia | Mar. 19, 1954 |
| 1,124,501 | France | Oct. 12, 1956 |